April 26, 1955
H. SCHOTTLER
2,707,108
COUPLING DEVICE
Filed May 17, 1952
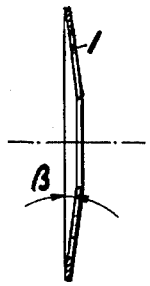
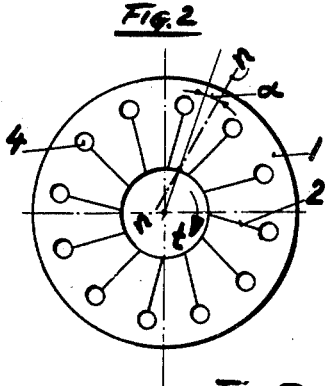
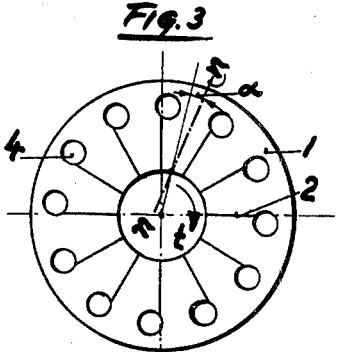
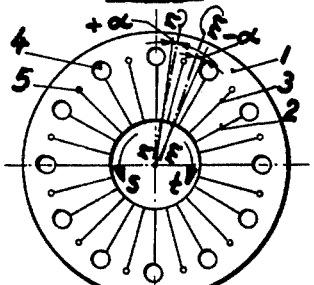
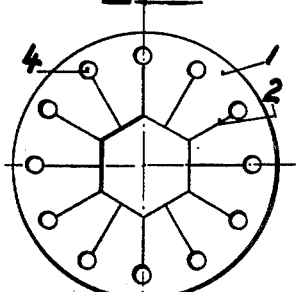
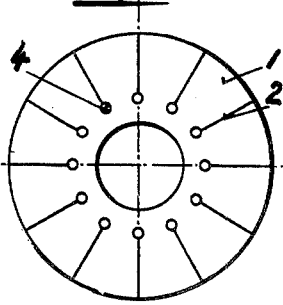
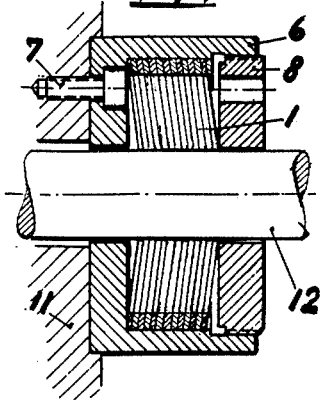
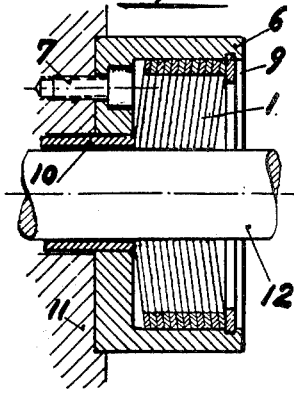
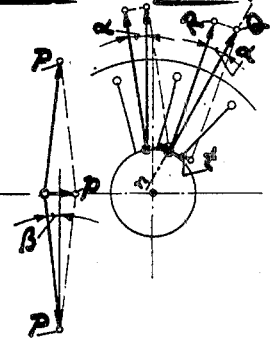
*INVENTOR.*
Henry Schottler
BY
Agent

2,707,108

COUPLING DEVICE

Henry Schottler, New Orleans, La.

Application May 17, 1952, Serial No. 288,469

8 Claims. (Cl. 279—54)

This invention relates to a coupling device, and, more specifically, to a rotational coupling or locking means primarily to be used in chucks, tool holders, and similar machine tool parts.

A principal object of the invention is to provide such a device which is particularly suitable for the indicated purpose due to its simple design, secure operation, easy control, small weight and complete balance, and which can easily be blanked out in a simple die.

Another object of the invention is to provide a rotational coupling device which exerts very high forces in radial direction against the abutting faces of the parts to be coupled when exposed to relatively small axial forces.

Other objects and advantages will be apparent from a consideration of the specification and claims.

The rotational coupling device of my invention has the form of a thin disc with a central opening, which disc is slightly dished out so as to take the shape of a truncated cone and which is divided into separate prongs extending either from the central opening toward the outer edge of the disc body or, inversely, from the outer edge toward its central opening. These prongs are obtained by spaced slits or slots extending from near the small periphery to the large periphery of the truncated cone or from near its large periphery to its small periphery, and they are adapted to exert a considerable radial force on the parts to be coupled while the force necessary for starting the coupling effect may be small due to the fact that the prongs act as rotational self-locking elements with increasing torque.

Other features of the invention include:

(a) An arrangement of the slits or slots in such a manner that the neutral bending planes of the prongs are slightly inclined to their radial direction so as to secure a locking effect in one direction while permitting of free wheeling in the opposite direction;

(b) An arrangement of such disc-like coupling elements axially one behind the other for improving the control of the workpiece or tool and its centering by increasing the axial gripping length of the coupling.

In the accompanying drawings forming a part of this specification and in which like numerals are employed to designate like parts, Fig. 1 is a sectional view in diameter direction through one embodiment of the disc-like coupling element;

Figs. 2–6 show, in plan view, various embodiments of such discs with different arrangements of the slits defining the prongs;

Figs. 7 and 8 show, in longitudinal section, two different chucks with the coupling elements of the invention arranged in series;

Figs. 9 and 10 are diagrams of forces acting on the prongs of the coupling disc in both axial and radial direction.

As shown in Fig. 1, the disc 1, blanked out from thin spring material, for instance, high carbon spring steel, properly hardened and tempered, is shaped to the form of a truncated cone with a relatively small cone angle β. By equally spaced slits 2 (Figs. 2, 3, 5, 6), or by such slits 2 and additional slits 3 (Fig. 4), all of them extending from the one periphery of the truncated cone to near the opposite periphery, there are formed separate prongs which increase the flexibility of the disc, when small forces are applied in axial direction. Instead of slits 2 and 3, longitudinal openings or slots may be arranged so that there is a narrow spacing between the prongs.

To avoid stress raisers, the slits or slots 2 and 3 preferably end in holes 4, which are of a diameter larger than the width of such slots. As shown in Fig. 2, the slits or slots 2 are so inclined to the radial direction that the neutral bending line $n$—$n$ of the prongs between the slits or slots forms a small angle $\alpha$ with the radial direction. This results in a rotational self-locking effect in one direction (for instance, in the direction indicated by the arrow in Fig. 2) and in free wheeling in the opposite direction.

The same result can be achieved by the radially extending slits or slots of Fig. 3, if the centers of the holes 4 are offset to the slits as shown. Here, too, the neutral bending plane $n$—$n$ is inclined to the radial direction at a small angle.

In Fig. 4, two sets of equally spaced slits 2, 3 are shown, of which slits 2 terminate in larger holes 4, slits 3 in smaller holes 5. The neutral bending lines $n$—$n$ and $m$—$m$ of two adjacent prongs are therefore oppositely inclined to the radial direction under slight angles $\alpha$, as can be seen from Fig. 4. By this means a self-locking coupling effect is secured not only in one but in two rotational directions.

In the embodiment illustrated in Fig. 5, a coupling disc is provided with a hexagonal inner center hole. Slits 2 are arranged radially, ending again at their roots in enlarged holes 4. While in Fig. 5 the slits extend from the inner central opening, and holes 4 are located near the outer edge, the arrangement is reversed in Fig. 6 where the slits start at the outer periphery of the truncated cone and terminate in holes 4 provided in the body of the disc near the central opening.

Fig. 7 shows the application of a plurality of discs 1, arranged behind each other, as a rotational coupling element in a chuck. 6 is a casing connected to the face plate 11 of a lathe by a screw 7 or other appropriate means. In this instance, the coupling discs 1 are provided with slits starting at their inner opening, as in the embodiments of Figs. 1–5. A thrust disc 8 may be screwed into casing 6 so that discs 1 are pressed together and clamp the workpiece 12 tightly with their inner bearing surfaces.

In Fig. 8, a similar chuck-like application employing a series of discs is illustrated. In this embodiment, however, the inclination of the discs 1 is reversed, whereby the discs are held in position by a retaining ring 9 sprung into a groove of the casing 6. A sleeve 10 surrounding workpiece 12 is pressed under an appropriate load against the inner circumference of the discs 1 so that there is a thrust exerted on discs 1 whereby they are pressed tightly against workpiece 12 with their inner bearing surfaces. The loading of sleeve 10 may be controlled by hydraulic, electrical or mechanical means. The arrangement of Fig. 8 is especially suitable as a chuck for automatically controlled machine tools.

The force diagram of Fig. 9 demonstrates that a small axial thrust $p$ produces a considerable radial gripping force P according to the formula:

$$P = \frac{p}{2 \times \sin \beta}$$

Fig. 10 shows also that the radially directed locking force follows the formula:

$$R = \frac{t}{tg\alpha}$$

wherein $t$ is the tangentially directed force acting on the circumference of the workpiece corresponding to the torque exerted on the workpiece. If the angle $\alpha$ remains smaller than the friction angle, depending on the friction coefficient between the abutting surfaces of coupling discs and workpiece, a slip-free hold of the workpiece is insured. It is obvious that, by increasing the number of the prongs into which the discs are subdivided, the angle $\alpha$ can always be held small enough. It is further obvious that the pretensioning force P of the discs for gripping workpiece 12 has only to be large enough to keep the workpiece 12 in concentric position to casing 6. The axial pressure $p$ for initiating the coupling action remains therefore small and can be produced, even for chucks of large diameter, without additional controlling means.

As has been stated previously, the disc 1 of Figs. 2 and 3 locks only in one rotational direction while permitting free-wheeling motion in the opposite direction. This is so because in this latter direction the angle $\alpha$ is negative so that there is no self-locking effect. If, however, a self-locking effect in both directions is desired, discs with oppositely inclined prongs may be employed alternately, that is to say, discs in which the neutral planes $n$—$n$ are inclined in the opposite direction. In the manufacturing process, the same tools may be used for both types of discs, whereby only one set of discs is, after blanking, dished out in the one direction while the other set is dished out in the opposite direction.

The disc in Fig. 4 is self-locking in both directions because the neutral plane $m$—$m$ of one prong is oppositely inclined to the neutral plane $n$—$n$ of the adjacent prong. The neutral plane $m$—$m$ forms an angle $-\alpha$ with the radial direction, the neutral plane $n$—$n$, the angle $+\alpha$. Consequently, disc 1 of Fig. 4 has one set of prongs locking the workpiece in one direction alternating with a second set of prongs locking the workpiece against rotation in the opposite direction.

Since the coupling discs 1 are preferably made from spring material, they return, when released, to their original position. The inherent resiliency of the coupling discs may be increased by separately arranged additional springs.

The outer circumference of a coupling disc may be provided with teeth or ribs to increase the gripping forces between this outer circumference and the corresponding face of the casing.

The term "neutral plane" employed hereinabove is used in analogy to the term "neutral plane of a beam." Such neutral plane undergoes no change in length due to bending and the direct stress along such plane is zero. The fibers on one side of the neutral plane are stressed in tension and on the other side in compression, and the intensities of these stresses in homogeneous beams are directly proportional to the distances of the fibers from the neutral plane.

While I have shown and described certain preferred embodiments of the invention, it will be understood that the invention is capable of variation and modification from the form shown so that its scope should be limited only by the scope of the claims appended hereto.

I claim:

1. A rotational coupling device of the character described comprising a resilient disc having a central opening, said disc being buckled when in idle condition and subdivided into deformable prongs extending from one edge of the disc toward the other edge, the neutral planes of said prongs being inclined, under an acute angle, to their respective radial directions.

2. A rotational coupling device of the character described, comprising a resilient disc having a central opening, said disc being conically dished out when in idle condition and divided into deformable prongs, the dividing lines of said prongs terminating in holes near one edge of said disc, the center of said holes being offset to said dividing lines in peripheral direction, whereby the neutral planes of said prongs are inclined to their respective radial directions.

3. A rotational coupling device of the character described comprising a resilient disc having a central opening and being dished out when in idle condition to form a truncated cone, said disc being subdivided into independent deformable prongs, the dividing lines of said prongs terminating in holes near the one edge of the truncated cone, said holes being alternately of larger and smaller diameter so that the neutral planes of two adjacent prongs are oppositely inclined to their respective radial directions.

4. A rotational coupling device comprising a casing and a set of resilient discs arranged in series, each disc having a central opening and being dished out to form in idle condition a truncated cone, said cone being subdivided into independent deformable prongs, the neutral planes of said prongs being inclined to their respective radial directions at an acute angle, the outer circumference of each disc abutting the inner face of the casing, the inner circumference being adapted on flattening of the disc to grip a member to be coupled to the casing for rotation in one direction but allowing free wheeling in the opposite direction.

5. A coupling device comprising a casing, two sets of resilient discs having a central opening and being dished out to the shape of a truncated cone, both sets of discs being subdivided into prongs, the neutral planes of which are inclined to their respective radial directions, the neutral planes of one set being inclined in one direction, and the neutral planes of the other set being inclined in the opposite direction.

6. A coupling device comprising a casing, two alternating sets of interposed resilient discs in said casing and rotatable therewith, each disc having the form of a truncated cone and having a central opening to receive a member to be coupled, said discs being subdivided into prongs whose neutral planes are inclined to their respective radial directions, the neutral planes of the prongs of the discs of the one set being inclined in one direction, the neutral planes of the prongs of the discs of the other set being inclined in the opposite direction.

7. A rotational coupling device as defined in claim 4 wherein in each disc the dividing lines of the prongs terminate in holes near one edge of said disc and the centers of said holes are offset to said dividing lines in peripheral direction.

8. A rotational coupling device as defined in claim 4 wherein in each disc the dividing lines of the prongs terminate in holes near the one edge of said disc and wherein said holes are alternately of larger and smaller diameter.

References Cited in the file of this patent

UNITED STATES PATENTS

| | | |
|---|---|---|
| 2,251,379 | Van der Hof | Aug. 5, 1941 |
| 2,384,297 | Goepfrich | Sept. 4, 1945 |
| 2,399,886 | Odevseff | May 7, 1946 |
| 2,486,663 | Lovejoy | Nov. 1, 1949 |

FOREIGN PATENTS

| | | |
|---|---|---|
| 808,085 | Germany | 1951 |